(12) United States Patent
Lee et al.

(10) Patent No.: US 11,481,832 B2
(45) Date of Patent: Oct. 25, 2022

(54) ELECTRONIC APPARATUS AND METHOD FOR SUMMARIZING CONTENT THEREOF

(71) Applicant: SAMSUNG ELECTRONICS CO., LTD., Suwon-si (KR)

(72) Inventors: Ji-yeon Lee, Suwon-si (KR); Ji-hyun Rho, Seoul (KR); Won-ho Ryu, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/103,701

(22) Filed: Nov. 24, 2020

(65) Prior Publication Data

US 2021/0082038 A1    Mar. 18, 2021

Related U.S. Application Data

(63) Continuation of application No. 15/824,773, filed on Nov. 28, 2017, now Pat. No. 10,878,488.

(30) Foreign Application Priority Data

Nov. 29, 2016  (KR) .......................... 10-2016-0160125
Nov. 1, 2017   (KR) .......................... 10-2017-0144782

(51) Int. Cl.
*G06F 17/00*    (2019.01)
*G06Q 30/06*    (2012.01)
(Continued)

(52) U.S. Cl.
CPC ....... *G06Q 30/0643* (2013.01); *G06F 3/0485* (2013.01); *G06F 3/0488* (2013.01);
(Continued)

(58) Field of Classification Search
CPC ........... G06Q 30/0643; G06Q 30/0623; G06F 40/30; G06F 40/169; G06F 16/90332;
(Continued)

(56) References Cited

U.S. PATENT DOCUMENTS 5,909,212 A    6/1999   Nishina
6,304,259 B1  10/2001   DeStefano
(Continued)

FOREIGN PATENT DOCUMENTS

CN    103294706    9/2013
CN    104169682   11/2014
(Continued)

OTHER PUBLICATIONS

Bose, Joy, et al, "A Framework for Text Summarization in Mobile Web Browsers", 2013 IEEE International Conference on Computational Intelligence and Computing Research, DOI: 10.1109/ICCIC. 2013.6724210, pp. 1-6, Dec. 1, 2013 (Year: 2013).*

(Continued)

*Primary Examiner* — Laurie A Ries
(74) *Attorney, Agent, or Firm* — Nixon & Vanderhye, P.C.

(57) ABSTRACT

An example electronic apparatus and an example method for summarizing content thereof are provided. The example method includes displaying content on a display; based on receiving user input for content summarization, determining, as a content summarization range, from among content areas which are not displayed on the display, a content area corresponding to a location on the display at which the user input is detected; summarizing content within the content summarization range according to a type of the content; and displaying the summarized content along with the displayed content. The example electronic apparatus and example method may summarize the content by using a rule-based algorithm or an Artificial Intelligence (AI) algorithm.

17 Claims, 19 Drawing Sheets

(51) Int. Cl.
*G06F 3/0488* (2022.01)
*G06F 16/738* (2019.01)
*G06F 40/30* (2020.01)
*G06F 40/169* (2020.01)
*G06F 16/9032* (2019.01)
*G06F 3/0485* (2022.01)
*G06F 3/04886* (2022.01)

(52) U.S. Cl.
CPC ........ *G06F 3/04886* (2013.01); *G06F 16/739* (2019.01); *G06F 16/90332* (2019.01); *G06F 40/169* (2020.01); *G06F 40/30* (2020.01); *G06Q 30/0623* (2013.01)

(58) Field of Classification Search
CPC .. G06F 16/739; G06F 3/04886; G06F 3/0488; G06F 3/0485
See application file for complete search history.

(56) References Cited

U.S. PATENT DOCUMENTS

| | | | |
|---|---|---|---|
| 7,120,613 | B2 | 10/2006 | Murata |
| 8,108,398 | B2 * | 1/2012 | Guday .................. G06F 16/345 707/739 |
| 8,434,001 | B2 | 4/2013 | Kandekar |
| 8,527,904 | B2 * | 9/2013 | Liu ........................ G06F 3/0482 715/810 |
| 8,949,707 | B2 | 2/2015 | Lee et al. |
| 9,335,899 | B2 | 5/2016 | Kim |
| 9,448,589 | B2 | 9/2016 | Lee et al. |
| 9,733,784 | B1 | 8/2017 | King |
| 2002/0194230 | A1 * | 12/2002 | Polanyi ................. G06F 40/289 707/E17.094 |
| 2008/0244513 | A1 * | 10/2008 | January ................... G06F 8/316 717/113 |
| 2009/0106653 | A1 | 4/2009 | Lee |
| 2011/0016386 | A1 * | 1/2011 | Odagiri ................. G06F 16/957 715/243 |
| 2012/0056901 | A1 * | 3/2012 | Sankarasubramaniam .................. G06F 3/017 345/660 |
| 2012/0210203 | A1 * | 8/2012 | Kandekar ........... G06F 15/0291 715/230 |
| 2013/0179949 | A1 * | 7/2013 | Shapiro ................... G06F 21/10 726/4 |
| 2013/0227401 | A1 | 8/2013 | Kandekar et al. |
| 2014/0109009 | A1 | 4/2014 | Xu |
| 2014/0201217 | A1 | 7/2014 | Hatami-Hanza |
| 2014/0232730 | A1 | 8/2014 | Asai |
| 2014/0325407 | A1 * | 10/2014 | Morris .................. G06F 3/0481 715/765 |
| 2015/0026640 | A1 | 1/2015 | Wei |
| 2015/0046082 | A1 | 2/2015 | Okamoto |
| 2015/0058114 | A1 * | 2/2015 | Yi ....................... G06Q 30/0242 705/14.41 |
| 2015/0066501 | A1 | 3/2015 | Thapliyal |
| 2015/0169736 | A1 | 6/2015 | MacPherson |
| 2015/0193094 | A1 | 7/2015 | Armitage |
| 2015/0278187 | A1 | 10/2015 | Eldawy |
| 2015/0286391 | A1 | 10/2015 | Jacobs |
| 2015/0347403 | A1 * | 12/2015 | MacArthur ........... G06F 40/258 715/254 |
| 2015/0379353 | A1 | 12/2015 | Mate |
| 2016/0043979 | A1 | 2/2016 | Stern |
| 2016/0055134 | A1 | 2/2016 | Sathish et al. |
| 2016/0162569 | A1 | 6/2016 | Erle |
| 2016/0299649 | A1 | 10/2016 | Fujita |
| 2016/0349851 | A1 * | 12/2016 | Eskolin ............... G06F 3/04883 |
| 2017/0025096 | A1 * | 1/2017 | Fan ........................ H04L 51/04 |
| 2017/0329855 | A1 | 11/2017 | Ryu |
| 2017/0364587 | A1 * | 12/2017 | Krishnamurthy ..... G06F 40/284 |
| 2018/0039708 | A1 | 2/2018 | Gourley |
| 2020/0034433 | A1 * | 1/2020 | Cassidy .................. G06F 40/40 |

FOREIGN PATENT DOCUMENTS

| | | |
|---|---|---|
| JP | 2008-252322 A | 10/2008 |
| JP | 2012-008970 | 1/2012 |
| JP | 2012-008970 A | 1/2012 |
| JP | 2015-222513 A | 12/2015 |
| JP | 5869711 B1 | 2/2016 |
| KR | 10-2009-0041244 | 4/2009 |
| KR | 10-2015-0076366 | 7/2015 |
| KR | 10-2016-0065670 | 6/2016 |
| KR | 10-2016-0065670 A | 6/2016 |

OTHER PUBLICATIONS

Examination Report dated Feb. 18, 2021 in counterpart Indian Patent Application No. 201927025097 and English-anguage translation.
Examination Report dated Jun. 21, 2021 in counterpart European Patent Application No. 17876699.4.
Office Action dated Jul. 28, 2021 in Chinese Patent Application No. 201780073715.1 and English-language translation.
Search Report and Written Opinion dated Mar. 20, 2018 in counterpart International Patent Application No. PCT/KR2017/013632.
Extended Search Report dated Aug. 27, 2019 in counterpart European Patent Application No. 17876699.4.
Lee et al., U.S. Appl. No. 15/824,773, filed Nov. 26, 2017.
Tjondronegoro, D., et al, "Highlights For More Complete Sports Video Summarization", IEEE Multimedia, 2004, downloaded from https://ieeexpore.org/stamp/stamp.jsp?arnumber=1343827, pp. 22-37. (Year: 2004).
Notification of the Second Office Action dated Feb. 9, 2022 in counterpart Chinese Application No. 201780073715.1 and English-language translation.
Office Action dated May 31, 2022 in Chinese Patent Application No. 201780073715.1 and English-language translation.

* cited by examiner

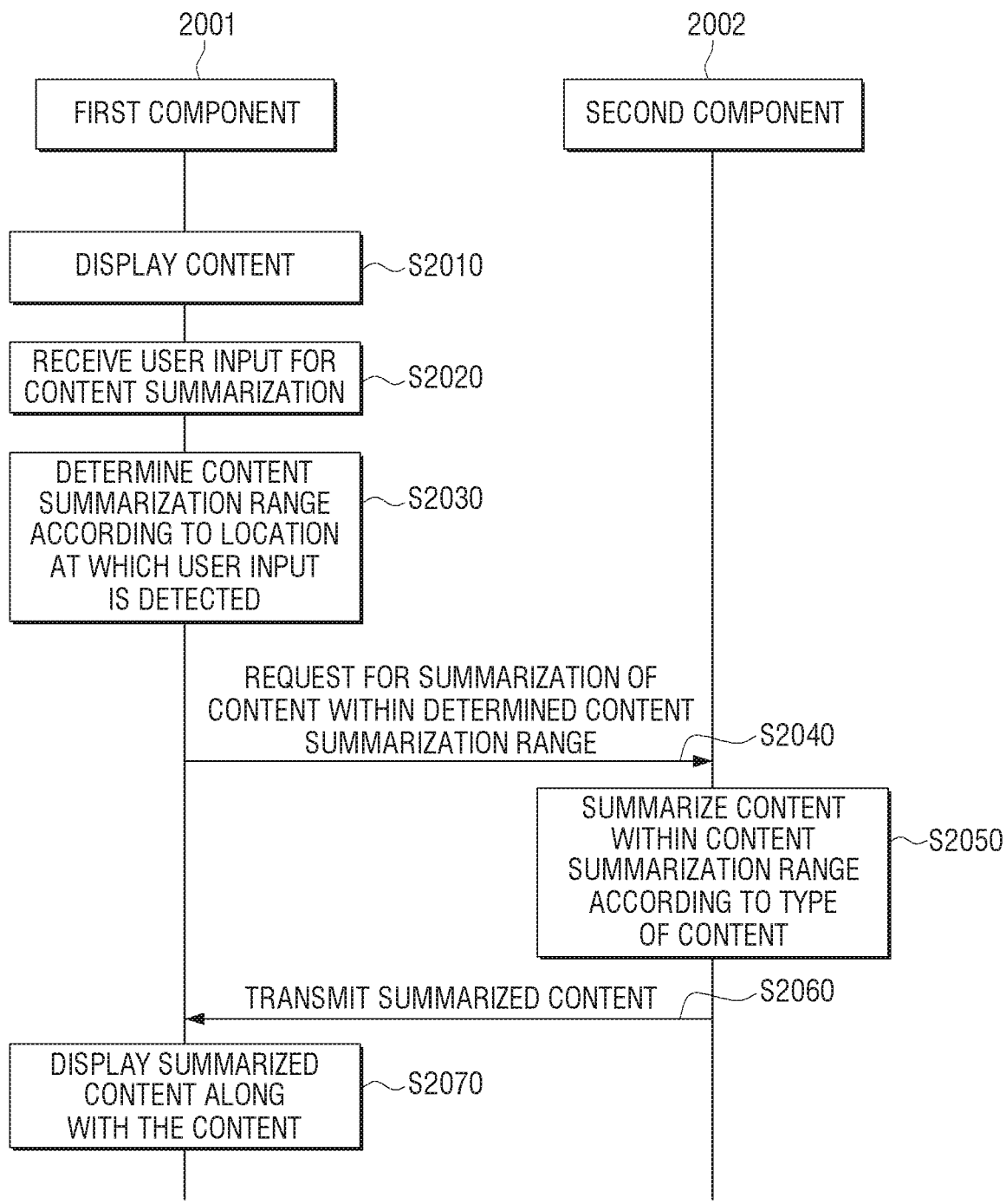

ELECTRONIC APPARATUS AND METHOD FOR SUMMARIZING CONTENT THEREOF

CROSS-REFERENCE TO RELATED APPLICATION

This application is a continuation of U.S. application Ser. No. 15/824,773, filed on Nov. 28, 2017, now U.S. Pat. No. 10,878,488, which claims priority to Korean Patent Application No. 10-2016-0160125, filed on Nov. 29, 2016, and to Korean Patent Application No. 10-2017-0144782, filed on Nov. 1, 2017. The contents of each of these applications are incorporated herein in their entirety.

BACKGROUND

1. Technical Field

The present disclosure generally relates to an electronic apparatus and a method for summarizing content, and more specifically, to an electronic apparatus which summarizes content and provides summarized content along with the content, and a corresponding method.

The present disclosure also generally relates to an Artificial Intelligence (AI) system which simulates a cognitive or determining function of a human brain by using a machine learning algorithm and applications thereof.

2. Description of Related Art

With the recent increase of content, users are unable to check all of the content. Accordingly, it would be desirable to summarize content for the user so that the user can check more content.

Recently, diverse methods for summarizing content have been developed for a user to check a large amount of content more quickly and conveniently. However, according to conventional methods, there is an inconvenience in that entire content should be summarized, or that a user should designate a content summarization range one by one.

Further, according to conventional methods, the content is summarized regardless of a type of the content, which decreases readability of the content.

Meanwhile, AI systems realizing human intelligence have been used in various fields in recent years. Generally, an AI system is characterized in that a machine learns, determines, and becomes smarter on its own, unlike existing rule-based smart systems. As a user uses an AI system, the AI system provides better recognition rate and better understanding of the user's taste or interests. In this regard, existing rule-based smart systems are being replaced with deep learning-based AI systems.

AI technologies include machine learning (for example, deep learning) and element technologies using the machine learning.

Machine learning refers to an algorithm technology in which a machine classifies and learns characteristics of input data for itself. The element technologies refer to technologies of simulating cognitive or determining functions of a human brain by using a machine learning algorithm, such as, deep learning, and may be divided into fields of linguistic understanding, visual understanding, reasoning/prediction, knowledge representation, and operation control.

AI technologies may be applied to various fields. Linguistic understanding refers to technology for recognizing, applying, and processing verbal/written languages of a human and includes natural language processing, machine translation, a conversation system, question and answer, and voice recognition/synthesis. Visual understanding refers to technology for recognizing and processing objects in a human's viewpoint and includes object recognition, object tracking, image search, human recognition, scene understanding, space understanding, and image improvement. Reasoning/prediction refers to technology for determining information and executing logical reasoning and prediction and includes knowledge/probability-based reasoning, optimization prediction, preference-based planning, and recommendation. Knowledge representation refers to technology for processing human experience information to be automated knowledge data and includes knowledge construction (generating/classifying data) and knowledge management (utilizing data). Operation control refers to technology for controlling automated driving of a vehicle and motion of a robot and includes motion control (navigation, collision, driving) and manipulation control (behavior control).

SUMMARY

An example aspect of the present disclosure provides an electronic apparatus which determines a content summarization range according to a user input and summarizes content within the content summarization range based on a type of the content and a method for summarizing content thereof.

According to an example embodiment of the present disclosure, a method for summarizing content of an electronic apparatus includes displaying content, determining, based on user input for content summarization being received, a content summarization range from content areas which are not displayed on a display in accordance with a location at which the user input is detected, summarizing content within the content summarization range according to a type of the content, and displaying the summarized content along with the content.

According to example another embodiment of the present disclosure, an electronic apparatus includes a display, an input unit configured to receive a user input, and a processor configured to display content on the display, based on user input for content summarization being received through the input unit, determine a content summarization range from content areas which are not displayed on the display in accordance with a location at which the user input is detected, summarize content within the content summarization range according to a type of the content, and control the display to display the summarized content on the content.

According to another example embodiment of the present disclosure, a non-transitory computer readable medium stores a program, that when executed by a computer of an electronic apparatus, causes the computer to execute displaying content, determining, based on user input for content summarization being received, a content summarization range from content areas which are not displayed on a display in accordance with a location at which the user input is detected, summarizing content within the content summarization range according to a type of the content, and displaying the summarized content on the content.

According to the above-described various example embodiments of the present disclosure, the electronic apparatus may provide summarized content by summarizing information corresponding to a user input from information which is not displayed in a display without summarizing the entire information of the content. Accordingly, a user is able to check the information which is not currently displayed more conveniently.

Further, the example electronic apparatus summarizes the content by a different summarization unit according to a type of the content and may provide the user with suitable summarized content.

BRIEF DESCRIPTION OF DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein:

FIG. 10B is a flowchart provided to describe an example in which a first component summarizes content by using a data summarization model;

DETAILED DESCRIPTION

Figure 1:
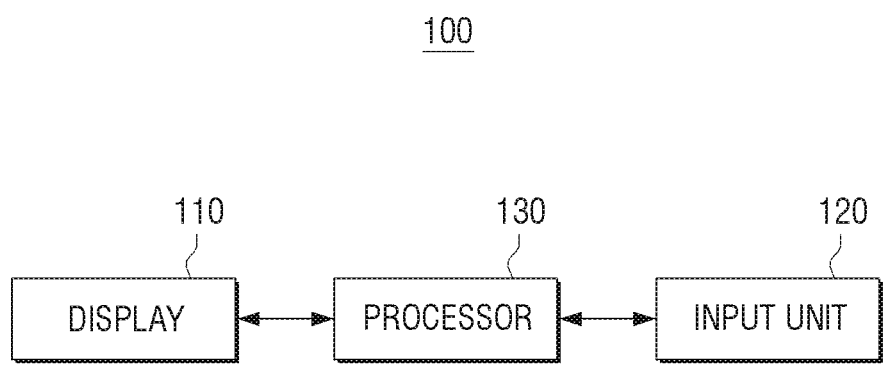
FIG. 1 is a block diagram illustrating a simple structure of an electronic apparatus according to an example embodiment disclosed herein.

Certain example embodiments are described below in greater detail with reference to the accompanying drawings. In the following description, like drawing reference numerals are used for the like elements, even in different drawings. The matters defined in the present disclosure, such as detailed construction and elements, are provided to assist in a comprehensive understanding of the example embodiments. However, embodiments can be practiced without those specifically defined matters. Also, well-known functions or constructions are not described in detail since they would obscure the present disclosure with unnecessary detail.

In the following description, terms with an ordinal number, for example, 'first' or 'second,' may be used to describe various elements, but the elements are not limited by the term. The terms including the ordinal number are used only to distinguish the same or similar elements. By way of example, 'first' element may be referred to as 'second' element, and the 'second' element may be also referred to as the 'first' element without deviating from the scope of the present disclosure. The term 'and/or' includes any one or combinations of a plurality of related elements.

The terms used in the following description are provided to describe example embodiments and are not intended to limit the scope of the present disclosure. A term in a singular form includes a plural form unless it is intentionally written that way. In the following description, a term, such as, 'include' or 'have', refers to the disclosed features, numbers, steps, operations, elements, parts, or combinations thereof and is not intended to exclude any possibilities of existence or addition of one or more other features, numbers, steps, operations, elements, parts, or combinations thereof.

A term 'module' or 'unit' refers to an element which performs one or more functions or operations. The 'module' or 'unit' may be realized as hardware, software, or combinations thereof. A plurality of 'modules' or 'units' may be integrated into at least one module and realized as at least one processor, except for a case in which the respective 'modules' or 'units' need to be realized as discrete specific hardware.

Hereinafter, the example embodiments of the present disclosure will be described in detail with reference to the accompanying drawings. FIG. 1 is a block diagram illustrating a simple structure of an electronic apparatus 100 according to an example embodiment disclosed herein. As illustrated in FIG. 1, the electronic apparatus 100 includes a display 110, an input unit 120, and a processor 130. In this case, the electronic apparatus 100 may be a smart phone, but this is only an example. The electronic apparatus 100 may be realized as diverse kinds of electronic apparatuses, such as, without limitation, a tablet Personal Computer (PC), a notebook PC, a Personal Digital Assistant (PDA), a smart TV, a projection TV, a kiosk, and so on.

The display 110 outputs image data. To be specific, the display 110 may display image content. In this case, the image content may include, without limitation, at least one of text, an image, video, and audio and may be one of various kinds of content, such as, news content, e-book content, or shopping content.

The input unit (e.g., input devices and associated input circuitry) 120 receives a user input for controlling the electronic apparatus 100. To be specific, the input unit 120 may receive a user input for summarizing content displayed in the display 110. In this case, the user input may be a user touch of touching a certain area of the display 110.

The processor (e.g., processing circuitry) 130 controls overall operations of the electronic apparatus 100. To be specific, based on user input for content summarization being received through the input unit 120, the processor 130 may determine a content summarization range from content areas which are not displayed on the display according to a location where the user input was detected, summarize the content within the content summarization range according to a type of the content, and control the display 110 to display the summarized content on the content.

To be specific, based on receiving user input of touching any of upper, lower, right, and left areas of the display, the processor 130 may determine, as a content summarization range, an area corresponding to a location at which the user input was input from among the content areas which are not displayed on the display. For example, in response to receiving a user input of touching an upper area of the display, the processor 130 may determine the upper area which is not displayed in the display as the content summarization range.

The processor 130 may determine a type of the content by analyzing the content and summarize the content by a different content summarization unit according to the type of the content. In this case, the processor 130 may determine the type of the content by analyzing the text, image, and video included in the content. The content summarization unit may be a unit for summarizing the content, and a paragraph, a chapter, a page, or an entire document may be the content summarization unit.

The processor 130 may determine the content summarization unit according to the type of the user input and summarize the content within the content summarization range by the determined content summarization unit. By way of example, based on a user input being a first touch (e.g., a touch within or less than a predetermined time), the processor 130 may summarize the content by a first content summarization unit (for example, a paragraph) and, in response to the user input being a second touch (e.g., a touch beyond or greater than a predetermined time), the processor 130 may summarize the content by a second content summarization unit (for example, an entire document).

To be specific, the processor 130 may analyze information of the content within the content summarization range, extract main text for a summary sentence based on the analyzed information, and generate summarized content by editing and arranging the extracted text. In this case, the processor 130 may summarize the content within the content summarization range based on a pre-stored data summarization model. This operation will be described below in further detail with reference to FIGS. 3. 4A, and 4B.

Based on receiving a user input for scrolling a screen while the summarized content is displayed, the processor 130 may control the display 110 to display summarized content having a content summarization range changed according to screen scrolling corresponding to the user input while a screen of the content is scrolled.

Further, based on user input being received for the summarized content, the processor 130 may control the display 110 to display an area corresponding to a part where the user input was received for the summarized content.

Figure 2:
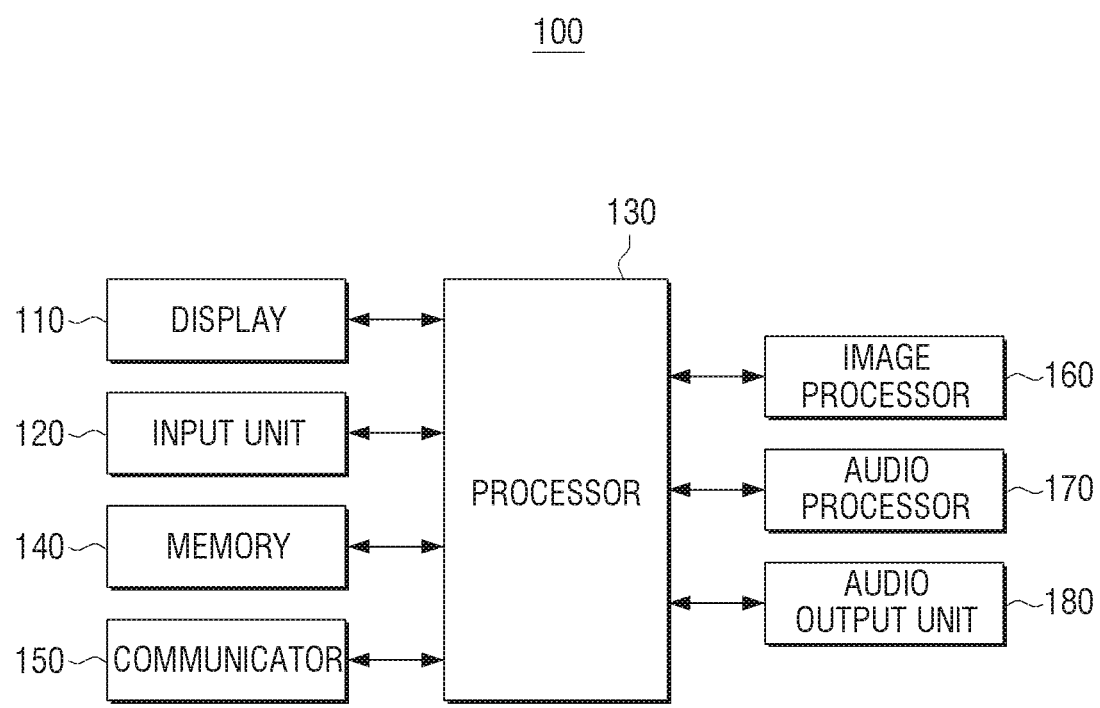
FIG. 2 is a block diagram illustrating a detailed structure of an electronic apparatus according to an example embodiment disclosed herein.

FIG. 2 is a block diagram illustrating a detailed structure of an electronic apparatus 100 according to an example embodiment disclosed herein. As illustrated in FIG. 2, the electronic apparatus 100 includes a display 110, an input unit 120, a memory 140, a communicator 150, an image processor 160, an audio processor 170, an audio output unit 180, and a processor 130.

The display 110 may display diverse image content, information, or a User Interface (UI) provided by the electronic apparatus 100. To be specific, the display 110 may display one of diverse image content (for example, news content, e-book content, blog content, or shopping content).

The display 110 may display the summarized content generated by the user input along with the image content.

The input unit 120 may receive user input for controlling the electronic apparatus 100 and transmit information based on the user input to the processor 130. For example, the input unit 120 may include, without limitation, a touch panel, a (digital) pen sensor, or a key. By way of example, the touch panel may be realized as at least one of a capacitive type, a pressure-resistive type, an infrared-ray type, or an ultrasonic wave type. The touch panel may further include a control circuit. The touch panel may further include a tactile layer and provide a user with a tactile response. The (digital) pen sensor may be realized as a part of the touch panel or include a summarization sheet, for example. The key may include a physical button, an optical key, or a keypad, for example.

In addition, the input unit 120 may be realized as various kinds of input devices, such as, without limitation, a keyboard, a mouse, a pointing device, a user motion summarization device, or the like.

The memory 140 may store diverse programs and data necessary for operations of the electronic apparatus 100. The memory 140 may be realized as, for example, a non-volatile memory, a volatile memory, a flash memory, a Hard Disk Drive (HDD), or a Solid State Drive (SSD). The memory 140 may be accessed by the processor 130, and the data in the memory may be read, recorded, modified, deleted, or updated by the processor 130. In the present disclosure, the term 'memory' may include the memory 140, a Read-Only Memory (ROM, not shown) in the processor, a Random Access Memory (RAM, not shown), or a memory card (not shown) installed in the electronic apparatus 100 (for example, a micro Secure Digital (SD) card or a memory).

The memory 140 may store programs and data for various screens to be displayed in a display area of the display 110. Further, the memory 140 may store a data summarization model generated by a learning algorithm for content summarization according to an example embodiment disclosed herein.

The communicator (e.g., communication circuitry) 150 may communicate with various types of external apparatuses according to diverse communication methods. The communicator 150 may include, without limitation, at least one of a Wireless-Fidelity (Wi-Fi) chip, a Bluetooth chip, a wireless communication chip, and a Near Field Communication (NFC) chip. The processor 130 may communicate with an external server or a various external apparatuses by controlling the communicator 150.

To be specific, the communicator 150 may receive the data summarization model for generating content from the external server.

The image processor (e.g., image processing circuitry such as a graphics processing unit (GPU) 160 may perform image processing with respect to the image data received from various sources. To be specific, the image processor 160 may perform various image processing operations, such as, decoding, scaling, noise filtering, frame rate conversion, and resolution conversion, with respect to the image data.

The audio processor (e.g., audio processing circuitry) 170 may process audio data. For example, the audio processor 170 may perform decoding, amplification, or noise filtering with preset to the audio data.

The audio output unit (e.g., speakers and associated circuitry) 180 may output various audio data processed by the audio processor 170 and also output various notification sounds or voice messages.

The processor 130 may be electrically connected with the components of the electronic apparatus 100 (for example, the display 110, the memory 140, and the input unit 120) and control overall operations and functions of the electronic apparatus 100. Particularly, the processor 130 may control the overall operations of the electronic apparatus 100 by using the diverse programs stored in the memory 140.

To be specific, in response to a user input for content summarization being received through the input unit 120 while the content is displayed in the display 110, the processor 130 may determine a content summarization range according to a location where the user input was detected, summarize the content within the content summarization range according to the type of the content, and control the display 110 to display the summarized content, for example, on the content. Meanwhile, according to an example embodiment disclosed herein, the processor 130 may summarize the content by using a data summarization model generated by using a learning algorithm. This operation will be described below in further detail with reference to FIGS. 3, 4A, and 4B.

Figure 3:
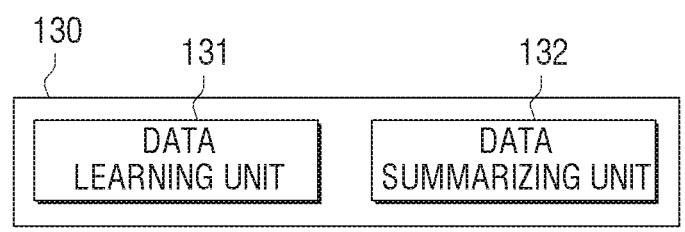
FIGS. 3, 4A and 4B are block diagrams illustrating a structure of a processor according to an example embodiment disclosed herein.

In some example embodiments, the processor 130 may include a data learning unit 131 and a data summarizing unit 132 as illustrated in FIG. 3.

The data learning unit 131 may learn criteria for content summarization. To be specific, the data learning unit 131 may learn the criteria as to which model to use in order to determine the content summarization or as to how to generate summarized content by using the summarized data for learning. The data learning unit 131 may learn the criteria for content summarization by acquiring the summarized data for learning to be used in the learning operation and applying the acquired summarized data for learning to the data summarization model. A detailed description on the data summarization model will be provided below.

The data learning unit 131 may allow the data summarization model to learn by using the content and generate the data summarization model for summarizing the content. In this case, the content may include at least one of text, image, and video.

The data learning unit 131 may allow the data summarization model to learn by using the content and the summarized content of the content as learning data.

According to an example embodiment, the data summarization model may be a model configured to summarize content. In this case, the learning data may be text and summarized text of the text.

As an example, the learning data may be the following text and the summarized text thereof: "the Meteorological Administration expects that today's weather will be affected by a pressure trough which will stay on the border of an anticyclone located in the central part of China and then go through the south. Accordingly, it is expected that the weather of the whole country will be mostly cloudy, and most parts of the country except for Seoul and Gyeonggi-do will experience occasional showers from noon and evening. Some rain is expected during the day in Seoul, Gyeonggi-do, and the northwestern part of Gangwon-do, and a cloudy sky and occasional showers caused by an east wind are expected in the eastern part of Gangwon-do and the eastern coast of Gyeongsang-do. The expected rainfall in the eastern part of Gangwondo, the south coast of Jeollanam-do, Gyeongsang-do, Ulleung-do, and Dok-do is about 5 to 40 mm, and the expected rainfall in the southwestern part of Gangwon-do, Chungcheong-do, Jeolla-do, and Cheju-do is about 5 mm. The morning's low temperature will range from 7 to 17 degrees, and the daytime's high temperature will range from 13 to 21 degrees. The temperature will drop a lot from the daytime of today to the 13th of this month due to cold air from the northwest." According to an embodiment, the summarized text may be generated by extracting and editing nouns, verbs, and adjectives which are frequently shown in the text. By way of example, the summarized text may be 'Seoul, Gyeonggi-do, Gangwon-do, raining in eastern coast of Gyeongsang-do, temperature drops' by using the frequently shown words 'Seoul,' 'Gyeonggi-do,' 'Gangwon-do,' 'eastern coast of Gyeongsang-do,' 'rain,' and 'temperature.'

According to various example embodiments, the data summarization model may be a model configured to summarize a plurality of images. In this case, the learning data may be the plurality of images and a representative image thereof.

As an example, the learning data may be a plurality of images displayed in a web page of a shopping mall and the largest image or an image displayed in the uppermost part of the web page.

According to various example embodiments, the data summarization model may be a model configured to summarize video. In this case, the learning data may be the video and a summarized video or a plurality of images of the video.

As an example, the learning data may be a plurality of images or a video obtained by extracting and combining a frame in which a person appears or a frame in which a location is changed from the video and the frames of the video.

The above-described data summarization models for summarizing text, a plurality of images, and video may be the same recognition model or may be different models. The respective data summarization models may include a plurality of data recognition models.

The data summarizing unit 132 may perform content summarization based on the summarized data. The data summarizing unit 132 may summarize content from certain data by using the learned data summarization model. The data summarizing unit 132 may acquire certain summarized data for recognition based on predetermined criteria by learning and use the data summarization model by using the acquired summarized data for recognition as an input value in order to perform the content summarization based on the certain summarized data for recognition. A result value outputted by the data summarization model using the acquired summarized data for recognition as the input value may be used to update the data summarization model.

The data summarizing unit 132 may estimate the summarized content by applying the content to the data summarization model. For example, the data summarizing unit 132 may acquire recognition data by applying the content to the data summarization model and providing the acquired recognition data to a processor of the electronic apparatus 100 (for example, the processor 130 of FIG. 1). The processor 130 may summarize the acquired recognition data.

According to an example embodiment, the data summarization model may be a model configured to summarize text. In this case, the data summarizing unit 132 may estimate summarized information of the text by applying the text to the data summarization model as recognition data. For example, the data summarization model may summarize the text by using nouns, verbs, and adjectives which are frequently shown in the text and sentences including the same.

According to various example embodiments, the data summarization model may be a model configured to summarize a plurality of images. In this case, the data summarizing unit 132 may estimate a representative image by applying the plurality of images to the data summarization model as recognition data.

According to various example embodiments, the data summarization model may be a model configured to summarize video. In this case, the data summarizing unit 132 may estimate summarized information of the video by applying the video to the data summarization model as recognition data. For example, the data summarization model may acquire a summarized video or a plurality of images by using a frame in which a persona appears in a large size or a frame in which a location is changed from among the frames of the video.

At least one of the data learning unit 131 and the data summarizing unit 132 may be realized as at least one hardware chip and installed in the electronic apparatus 100. By way of example, at least one of the data learning unit 131 and the data summarizing unit 132 may be realized as a dedicated hardware chip for AI or may be realized as a part of an existing universal general-purpose processor (for example, a Central Processing Unit (CPU) or an application processor) or a part of a Graphic Processing Unit (GPU) and installed in the above-described various electronic apparatuses.

According to an example embodiment, the dedicated hardware chip for AI may be a dedicated processor specialized for probability calculation and provide higher parallel processing performance as compared with the existing universal general-purpose processor. Accordingly, the dedicated hardware chip for AI may quickly execute a calculation operation for the AI field, such as, machine learning.

In this case, the data learning unit 131 and the data summarizing unit 132 may be installed in one electronic apparatus 100 or may be installed in different electronic apparatuses, respectively. For example, one of the data learning unit 131 and the data summarizing unit 132 may be included in the electronic apparatus, and the other one may be included in a server. Further, the data learning unit 131 and the data summarizing unit 132 may be connected in a wired and/or wireless manner and transmit model information built by the data learning unit 131 to the data summarizing unit 132 or transmit data inputted in the data summarizing unit 132 to the data learning unit 131 as additional learning data.

At least one of the data learning unit 131 and the data summarizing unit 132 may be realized as a software module. In response to at least one of the data learning unit 131 and the data summarizing unit 132 being realized as a software module (or a program module including instructions), the software module may be stored in a non-transitory computer readable medium. In this case, at least one software module may be provided by an Operating System (OS) or by a certain application. Further, some of the at least one software module may be provided by the OS, and the other may be provided by the certain application.

Figure 4A:
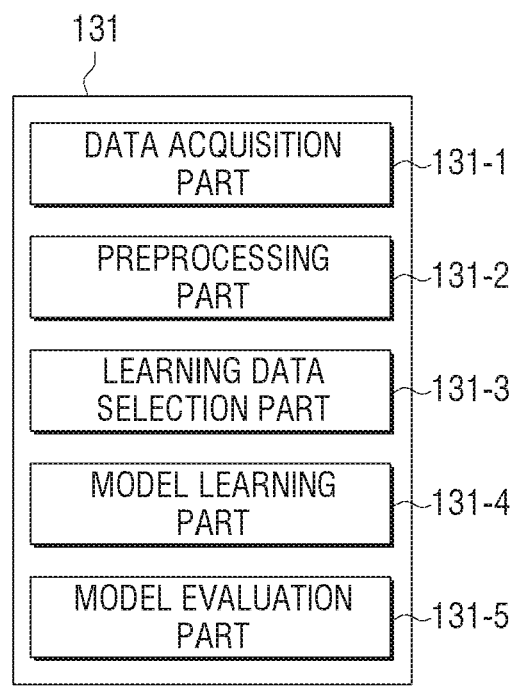

FIG. 4A is a block diagram illustrating the data learning unit 131 according to some example embodiments disclosed herein.

Referring to FIG. 4A, the data learning unit 131 according to some example embodiments may include a data acquisition part 131-1, a preprocessing part 131-2, a learning data selection part 131-3, a model learning part 131-4, and a model evaluation part 131-5. According to an example embodiment, the data learning unit 131 may include the data acquisition part 131-1 and the model learning part 131-4 as essential components and selectively include at least one or none of the preprocessing part 131-2, the learning data selection part 131-3, and the model evaluation part 131-5.

The data acquisition part 131-1 may acquire summarized data for learning which is necessary for the content summarization. The data acquisition part 131-1 may acquire the summarized data for learning which is necessary for the learning operation for the content summarization. In this case, the data acquisition part 131-1 may acquire image content received from an external apparatus or a server. The acquired image content may include at least one of text and an image and may be divided by a paragraph, a chapter, and a page.

The preprocessing part 131-2 may preprocess the acquired summarized data for learning so as to be used in the learning operation for the content summarization. The preprocessing part 131-2 may process the acquired data to be in a predetermined format so the model learning part 131-4 uses the acquired data for the learning operation for the content summarization. A detailed description on the model learning part 131-4 will be provided below.

As an example, in response to the summarized data for learning being text data, the preprocessing part 131-2 may perform a preprocessing operation, such as, sentence segmentation, part-of-speech tagging, tokenization, elimination of stop words, or stem extraction, with respect to the text data. As another example, in response to the summarized data for learning being image data, the preprocessing part 131-2 may perform processing operations, such as, decoding, scaling, noise filtering, or resolution conversion, with respect to the image data in order to make image frames in the same format. Further, the preprocessing part 131-2 may crop only a particular area from each of a plurality of inputted image frames.

The learning data selection part 131-3 may select the summarized data for learning which is necessary for the learning operation from the preprocessed summarized data for learning. The selected summarized data for learning may be provided to the model learning part 131-4. The learning data selection part 131-3 may select the summarized data for learning which is necessary for the learning operation from the preprocessed summarized data for learning according to predetermined criteria for the content summarization. Further, the learning data selection part 131-3 may select the data according to the criteria predetermined by the learning operation by the model learning part 131-4. A detailed description on the model learning part 131-4 will be provided below.

In this case, the learning data selection part 131-3 may select the summarized data for learning according to the type of the inputted content. For example, in response to the content being news content, the learning data selection part 131-3 may select only the data on areas excluding advertisement data included in the news content. The learning data selection part 131-3 may select some of the summarized data for learning from the preprocessed summarized data for learning, but this is only an example, and the learning data selection part 131-3 may select all of the preprocessed summarized data for learning.

The learning data selection part 131-3 may select the summarized data for learning according to a user input. For example, in response to a user input being a first touch, the learning data selection part 131-3 may select a paragraph as the summarized data for learning, and in response to the user input being a second touch, the learning data selection part 131-3 may select a passage as the summarized data for learning.

According to an example embodiment, the learning data selection part 131-3 may select the learning data before the preprocessing operation of the preprocessing part 131-2, needless to say.

The model learning part 131-4 may learn the criteria as to how to summarize the content based on the learning data. Further, the model learning part 131-4 may learn the criteria as to which learning data to use for the content summarization.

The model learning part 131-4 may allow the data summarization model used for the content summarization to learn by using the learning data. In this case, the data summarization model may be a prebuilt model. By way of example, the data summarization model may be a model which was prebuilt by receiving basic learning data (for example, text data or image data).

The data summarization model may be built by considering application areas of a summarization model, a purpose of learning, or computer performance of an apparatus. The data summarization model may be a model based on a neural network, for example. The data summarization model may be configured so as to simulate a structure of a human brain on a computer. The data summarization model may include a plurality of network nodes which have weighted values and simulate neurons of a human neuropilus. The plurality of network nodes may be interconnected respectively so as to simulate synaptic activity of the neurons which exchange signals through a synapse. The data summarization model may include a neural network model or a deep-learning model developed from the neural network model, for example. In the deep-learning model, the plurality of network nodes may be located in different depths (or layers) and exchange data according to a convolution connection. By way of example, models, such as a Deep Neural Network (DNN), a Recurrent Neural Network (RNN), or a Bidirectional Recurrent Deep Neural Network (BRDNN), may be used as the data summarization model, but the present disclosure is not limited in this respect.

According to various example embodiments, based on a plurality of prebuilt data summarization models being present, the model learning part 131-4 may determine a data summarization model having high relevancy between the inputted learning data and the basic learning data as a data summarization model to learn. In this case, the basic learning data may be pre-classified according to a type of the data, and the data summarization model may be prebuilt according to the type of the data. As an example, the basic learning data may be pre-classified according to various criteria such as, without limitation, a generated area, a generated time, a size, a genre, a constructor, and a type of objects of the learning data.

Further, for example, the model learning part 131-4 may allow the data summarization model to learn by using a learning algorithm including an error back-propagation method or a gradient descent method.

The model learning part 131-4 may allow the data summarization model to learn through supervised learning using the learning data as an input value, for example. The model learning part 131-4 may also allow the data summarization model to learn through unsupervised learning which allows the data summarization model to learn a type of data necessary for the content summarization for itself without supervision, for example. Further, the model learning part 131-4 may allow the data summarization model to learn through reinforcement learning using feedback as to whether a result of the content summarization according to the learning is correct.

Further, in response to the data summarization model learned, the model learning part 131-4 may store the learned data summarization model. In this case, the model learning part 131-4 may store the learned data summarization model in the memory 140 of the electronic apparatus 100 which includes the data summarizing unit 132. Further, the model learning part 131-4 may store the learned data summarization model in a memory of a server which is connected with the electronic apparatus 100 through a wired and/or wireless network.

In this case, the memory 140 may store instructions or data related to at least one other component of the electronic apparatus together with the learned data summarization model, for example. Further, the memory 140 may store software and/or a program. The program may include kernel, middleware, an Application Programming Interface (API), and/or an application program (or 'application'), for example.

The model evaluation part 131-5 may input evaluation data in the data summarization model, and, in response to a summarization result outputted from the evaluation data not satisfying a predetermined criterion, allow the model learning part 131-4 to learn again. In this case, the evaluation data may be predetermined data for evaluating the data summarization model.

By way of example, in response to the number or a ratio of the evaluation data in which the summarization result is incorrect among the summarization results of the learned data summarization model with respect to the evaluation data exceeding a predetermined threshold value, the model evaluation part 131-5 may evaluate that the summarization result does not satisfy the predetermined criterion. For example, assume that there are 1,000 evaluation data, and the predetermined criterion is defined as 2%. In this case, in response to the learned data summarization model outputting incorrect summarization results with respect to more than 20 evaluation data, the model evaluation part 131-5 may evaluate that the learned data summarization model is not suitable.

In response to a plurality of learned data summarization models being present, the model evaluation part 131-5 may evaluate whether the respective learned data summarization models satisfy the predetermined criterion and decide a model satisfying the predetermined criterion as a final data summarization model. In this case, in response to a plurality of models satisfying the predetermined criterion, the model evaluation part 131-5 may decide any predetermined one or a certain number of models as the final data summarization model in the order of high evaluation scores.

At least one of the data acquisition part 131-1, the preprocessing part 131-2, the learning data selection part 131-3, the model learning part 131-4, and the model evaluation part 131-5 in the data learning unit 131 may be realized as at least one hardware chip and installed in the electronic apparatus. By way of example, at least one of the data acquisition part 131-1, the preprocessing part 131-2, the learning data selection part 131-3, the model learning part 131-4, and the model evaluation part 131-5 may be realized as a dedicated hardware chip for AI or may be realized as a part of the existing universal general-purpose processor (for example, a CPU or an application processor) or a part of a GPU and installed in the above-described various electronic apparatuses.

Further, the data acquisition part 131-1, the preprocessing part 131-2, the learning data selection part 131-3, the model learning part 131-4, and the model evaluation part 131-5 may be installed in the electronic apparatus 100 or installed in different electronic apparatuses, respectively. For example, some of the data acquisition part 131-1, the preprocessing part 131-2, the learning data selection part 131-3, the model learning part 131-4, and the model evaluation part 131-5 may be included in the electronic apparatus, and others may be included in a server, for example.

At least one of the data acquisition part 131-1, the preprocessing part 131-2, the learning data selection part 131-3, the model learning part 131-4, and the model evaluation part 131-5 may be realized as a software module. In response to at least one of the data acquisition part 131-1, the preprocessing part 131-2, the learning data selection part 131-3, the model learning part 131-4, and the model evaluation part 131-5 being realized as a software module (or a program module including instructions), the software module may be stored in a non-transitory computer readable medium. In this case, at least one software module may be provided by the OS or by a certain application. Further, some of the at least one software module may be provided by the OS, and the other may be provided by the certain application.

Figure 4B:
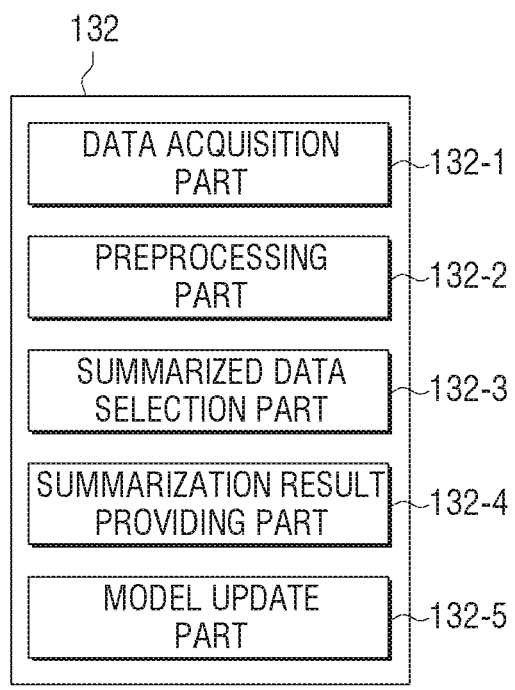

FIG. 4B is a block diagram illustrating the data summarizing unit 132 according to some example embodiments disclosed herein.

Referring to FIG. 4B, the data summarizing unit 132 according to some example embodiments may include a data acquisition part 132-1, a preprocessing part 132-2, a summarized data selection part 132-3, a summarization result providing part 132-4, and a model update part 132-5. According to an example embodiment, the data summarizing unit 132 may include the data acquisition part 132-1 and the summarization result providing part 132-4 as essential components and selectively include at least one or none of the preprocessing part 132-2, the summarized data selection part 132-3, and the model update part 132-5.

The data acquisition part 132-1 may acquire the data necessary for the content summarization. For example, the data acquisition part 132-1 may acquire at least one of text, image, and video.

The preprocessing part 132-2 may preprocess the acquired summarized data for recognition so as to be used for content summarization. The preprocessing part 132-2 may process the acquired summarized data for recognition to be in a predetermined format so the summarization result providing part 132-4 uses the acquired summarized data for recognition for the content summarization. A detailed description on the summarization result providing part 132-4 will be provided below.

The summarized data selection part 132-3 may select the summarized data for recognition which is necessary or used for content summarization from the preprocessed summarized data for recognition. The selected summarized data for recognition may be provided to the summarization result providing part 132-4. The summarized data selection part 132-3 may select some or all of the preprocessed summarized data for recognition according to the predetermined criteria for the content summarization. Further, the summarized data selection part 132-3 may select the summarized data for recognition according to the criteria predetermined by the learning of the model learning part 131-4. A detailed description on the model learning part 131-4 will be provided below.

The summarization result providing part 132-4 may summarize the content by applying the selected summarized data for recognition to the data summarization model. The summarization result providing part 132-4 may provide a summarization result according to a summarization purpose of data. The summarization result providing part 132-4 may apply the selected data to the data summarization model by using the summarized data for recognition selected by the summarized data selection part 132-3 as an input value. The summarization result may be determined by the data summarization model.

For example, the summarization result of news content and e-book content may be provided in the form of text, and the summarization result of shopping content may be provided in forms of text and an image(s).

The model update part 132-5 may update the data summarization model based on evaluation with respect to the summarization result provided by the summarization result providing part 132-4. For example, the model update part 132-5 may provide the summarization result received from the summarization result providing part 132-4 to the model learning part 131-4 so the model learning part 131-4 updates the data summarization model.

At least one of the data acquisition part 132-1, the preprocessing part 132-2, the summarized data selection part 132-3, the summarization result providing part 132-4, and the model update part 132-5 in the data summarizing unit 132 may be realized as at least one hardware chip and installed in the electronic apparatus 100. By way of example, at least one of the data acquisition part 132-1, the preprocessing part 132-2, the summarized data selection part 132-3, the summarization result providing part 132-4, and the model update part 132-5 may be realized as a dedicated hardware chip for AI or may be realized as a part of the existing universal general-purpose processor (for example, a CPU or an application processor) or a part of a GPU and installed in the above-described various electronic apparatuses.

The data acquisition part 132-1, the preprocessing part 132-2, the summarized data selection part 132-3, the summarization result providing part 132-4, and the model update part 132-5 may be installed in the electronic apparatus 100 or installed in different electronic apparatuses, respectively. For example, some of the data acquisition part 132-1, the preprocessing part 132-2, the summarized data selection part 132-3, the summarization result providing part 132-4, and the model update part 132-5 may be included in the electronic apparatus, and the other may be included in a server or other computer.

At least one of the data acquisition part 132-1, the preprocessing part 132-2, the summarized data selection part 132-3, the summarization result providing part 132-4, and the model update part 132-5 may be realized as a software module. Based on at least one of the data acquisition part 132-1, the preprocessing part 132-2, the summarized data selection part 132-3, the summarization result providing part 132-4, and the model update part 132-5 being realized as a software module (or a program module including instructions), the software module may be stored in a non-transitory computer readable medium. In this case, at least one software module may be provided by the OS or by a certain application. Further, some of the at least one software module may be provided by the OS, and the other may be provided by the certain application.

As described above, the processor 130 may summarize the content by using the data summarization model generated by using the learning algorithm.

Hereinafter, a method for summarizing content according to an embodiment will be described with reference to FIGS. 5A, 5B, 5C, 6, 7A, 7B, 8A, 8B, 9A, and 9B.

The processor 130 may control the display 110 to display content. In this case, the content may be image content including at least one of text, an image, and a video. By way of example, the content may include news content, e-book content, or web page content (for example, blog content or shopping content).

In this case, the processor 130 may control the display 110 to display a part of the content without displaying the entire content.

The processor 130 may enter a content summarization mode according to a user input. The content summarization mode may refer to a mode for summarizing content according to a user input of touching a certain area of the display. In response to a mode of the electronic apparatus 100 being converted to the content summarization mode, the processor 130 may control the display 110 or the audio output unit 180 to output an indicator which shows or indicates that the current mode is the content summarization mode. The content summarization mode is only an example, and the processor 130 may perform content summarization through a user input without entering the content summarization mode.

The processor 130 may receive a user input for content summarization through the input unit 120 while the content is displayed. In this case, the user input may be a user touch of touching a certain area of the display 110. In this case, the user touch may include various kinds of user touches, such as, a tap-touch input of tapping the display 110, a touch-and-hold input of maintaining a touch for a predetermined time, and a double-touch input of tapping the display 100 twice within a predetermined period of time.

The processor 130 may determine the content summarization range according to a location at which the user input was detected. To be specific, when user input of touching any of the upper, lower, right, and left areas of the display is received, the processor 130 may check an area which is currently displayed in the display 110 and determine an area corresponding to a location at which the user input was detected among the content areas which are not displayed in the display as the content summarization range.

Figure 5A:
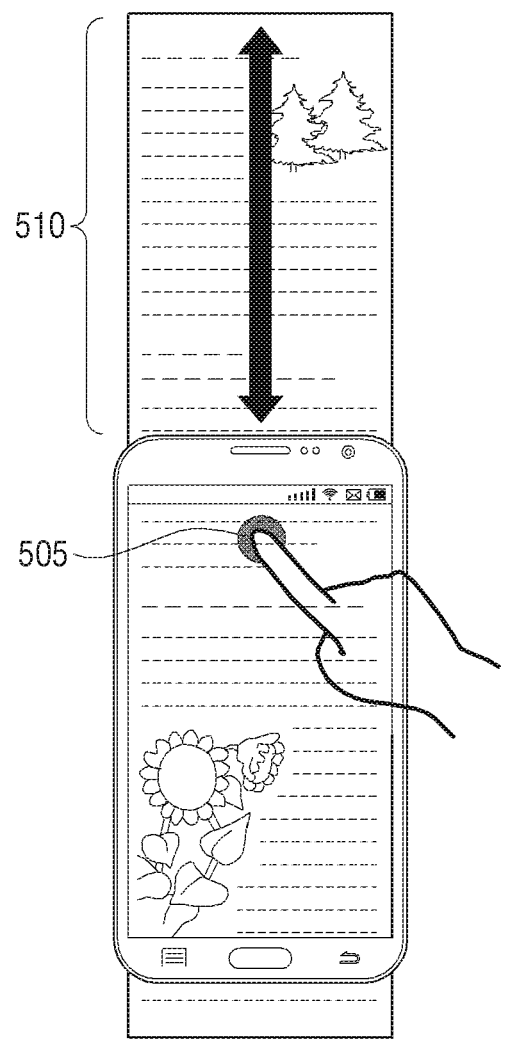
FIGS. 5A, 5B and 5C are diagrams provided to describe an example of selecting a content summarization range according to a location of a user input according to an example embodiment disclosed herein.
Figure 5B:
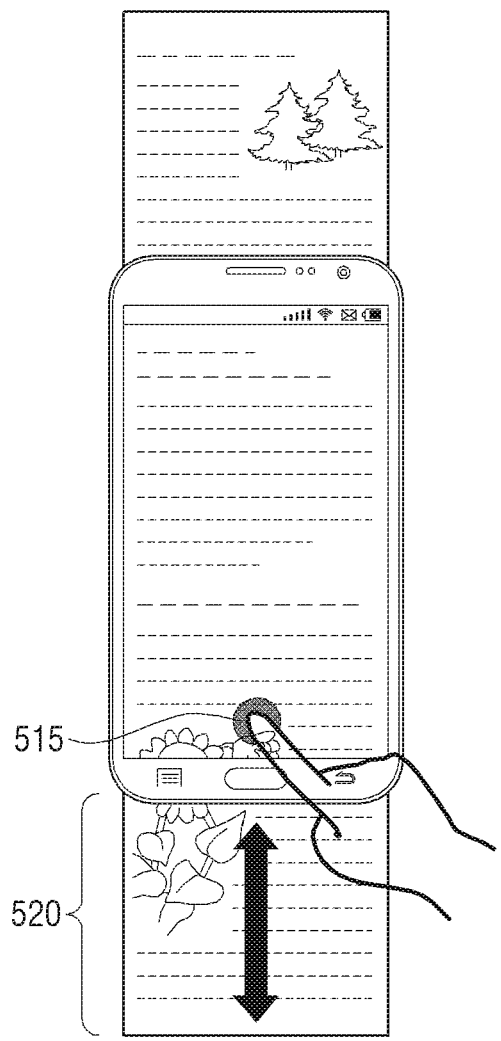
Figure 5C:
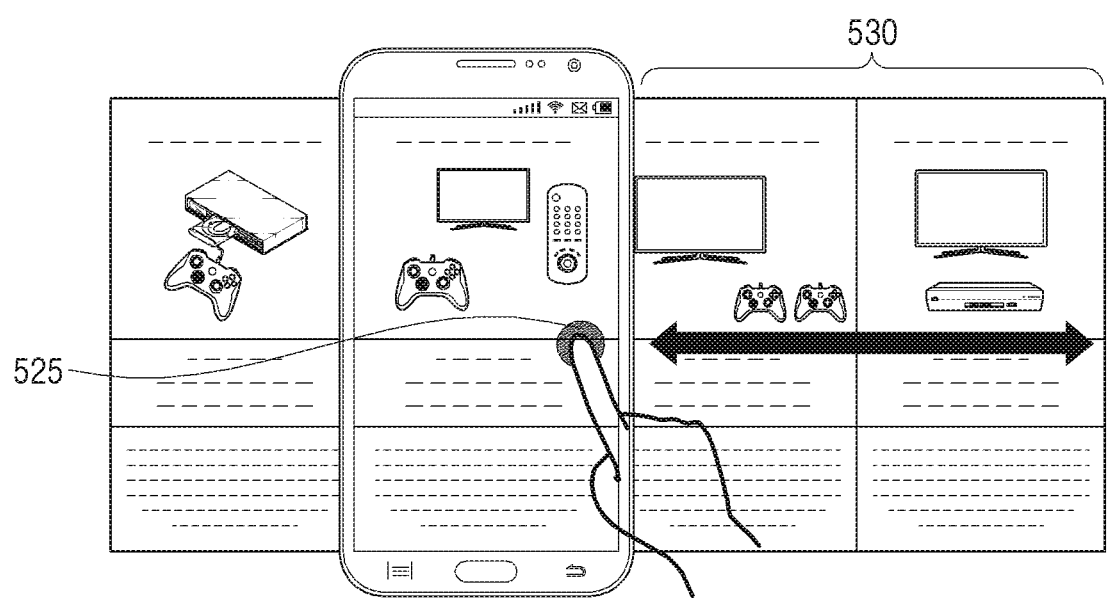

As an example, as illustrated in FIG. 5A, in response to receiving a user input 505 of touching an upper area while a part of the content is displayed, the processor 130 may determine an area 510 which is located in an upper part among the content areas which are not displayed in the display as the content summarization range. As another example, as illustrated in FIG. 5B, in response to receiving a user input 515 of touching a lower area while a part of the content is displayed, the processor 130 may determine an area 520 which is located in a lower part among the content areas which are not displayed in the display as the content summarization range. As still another example, as illustrated in FIG. 5C, in response to receiving a user input 525 of touching a right part while a part of the content including pages is displayed, the processor 130 may determine pages 530 which are located on the right side among the content areas which are not displayed in the display as the content summarization range.

Further, the processor 130 may determine a size of the content summarization range according to the type of the user input. For example, in response to the tap-touch input with respect to the upper part being detected while a part of the content is displayed, the processor 130 may determine a paragraph located in an upper part of a currently displayed screen among the content areas which are not displayed in the display as the content summarization range. Further, in response to the touch-and-hold input with respect to the upper part being detected while a part of the content is displayed, the processor 130 may determine entire areas located in the upper part of the currently displayed screen among the content areas which are not displayed in the display as the content summarization range.

The processor 130 may summarize the content within the content summarization range according to the type of the content. The processor 130 may determine a type of the content by analyzing the current content. To be specific, the processor 130 may determine the type of the currently displayed content by analyzing the text or image included in the current content.

The processor 130 may summarize the content by different content summarization units based on the type of content. Content summarization unit may refer to a unit for summarizing the content, and the content summarization may be performed for each content summarization unit. In this case, a paragraph, a chapter, a page, and an entire document may, for example, be the content summarization unit.

According to an example embodiment, based on the type of currently displayed content being news content or blog content, the processor 130 may determine a paragraph as the content summarization unit. In this case, the processor 130 may analyze tag information on a source code of a web page and recognize the paragraph which is the content summarization unit. Based on the type of currently displayed content being magazine content or e-book content, the processor 130 may determine a section as the content summarization unit. In this case, the processor 130 may recognize a section unit by including a subtitle or a sentence including a bold font. Based on the type of currently displayed content being application content including a plurality of pages, the processor 130 may determine a page as the content summarization unit.

Further, the processor 130 may summarize the content by different content summarization units according to user input. For example, in response to the tap-touch input with respect to the upper part being detected while a part of the content is displayed, the processor 130 may determine a paragraph as the content summarization unit. Further, in response to the touch-and-hold input with respect to the upper part being detected while a part of the content is displayed, the processor 130 may determine an entire upper part as the content summarization unit.

The processor 130 may perform content summarization for each content summarization unit. For example, based on three paragraphs being present in the content summarization range, and the content summarization unit being defined as a paragraph, the processor 130 may perform the content summarization for each of the three paragraphs. Further, based on three paragraphs being present in the content summarization range, and the content summarization unit being defined as an entire area, the processor 130 may perform the content summarization for all three paragraphs.

Figure 6:
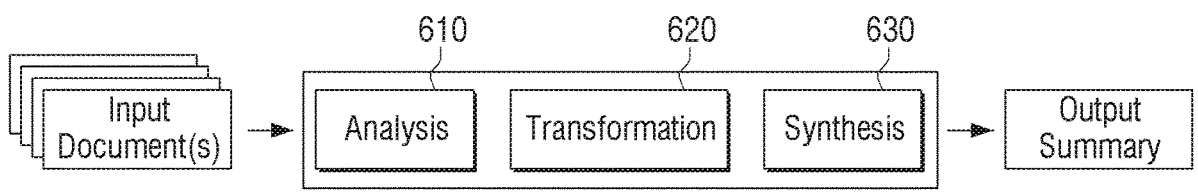
FIG. 6 is a diagram provided to describe a method for summarizing content according to an example embodiment disclosed herein.

Particularly, text summarization may be executed through three operations of analysis 610, transformation 620, and synthesis 630 as illustrated in FIG. 6. In the analysis operation 610, information on the content within the content summarization range may be analyzed by the content summarization unit. In the transformation operation 620, main text for forming a summary sentence may be extracted based on the analyzed information. In the synthesis operation 630, the summarized content may be generated and output by arranging and editing the extracted text.

According to an example embodiment disclosed herein, the processor 130 may perform content summarization by using the data summarization model generated by using the learning algorithm described above in FIGS. 3, 4A, and 4B, but this is only an example. The processor 130 may summarize the content by other summarization methods. By way of example, the processor 130 may determine a main theme of the content summarization unit through semantic analysis of the text included in the content, extract at least one representative sentence from each content summarization unit based on the determined main theme, and generate the summarized content by arranging or synthesizing the representative sentence of each content summarization unit.

According to an example embodiment disclosed herein, the processor 130 may perform generic summarization for summarizing content according to a type of content for general users and perform query-based summarization for summarizing content to be suitable for interests of a specific user. Further, the processor 130 may perform extractive summarization for extracting and summarizing sentences with meaning from the inputted text according to a type of summarized content and perform abstractive summarization for modifying extracted sentences or generating and summarizing new sentences.

Figure 7A:
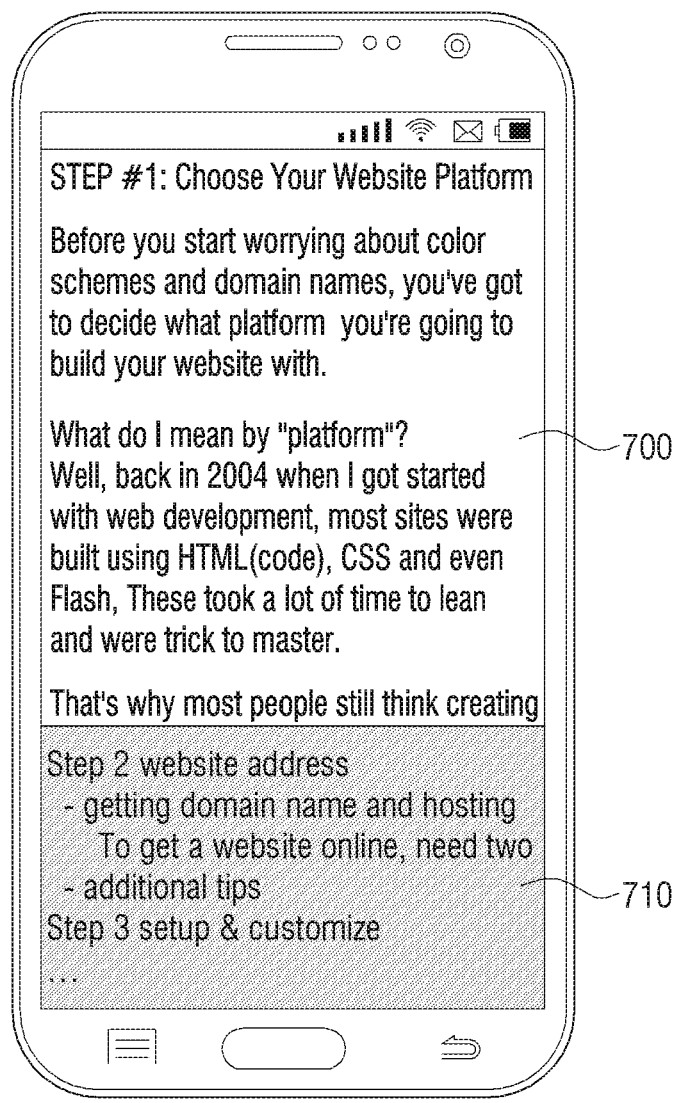
FIGS. 7A, 7B, 8A. 8B, 9A, and 9B are diagrams provided to describe a method for displaying summarized content according to various example embodiments disclosed herein.
Figure 7B:
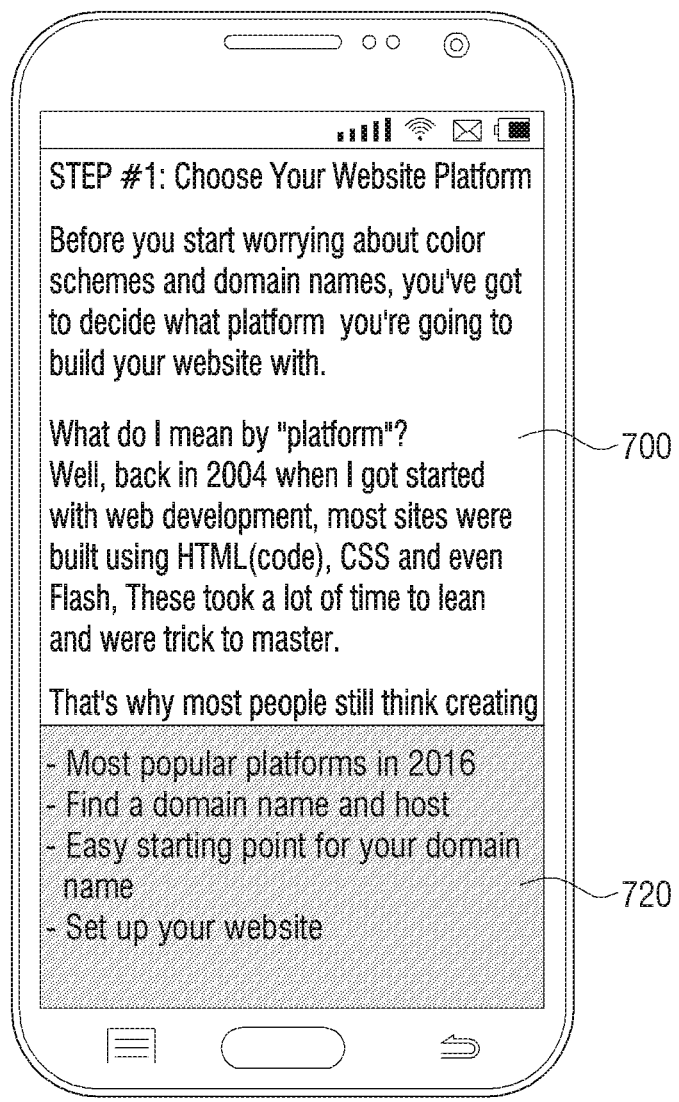

Particularly, the processor 130 may generate different summarized content for each content summarization unit. Based on the content summarization unit being a chapter or a paragraph, the processor 130 may generate summarized content 710 formed in a chapter unit or a paragraph unit as illustrated in FIG. 7A, and in response to the content summarization unit being an entire area, the processor 130 may generate one summarized content 720 regardless of the unit, such as, a chapter or a paragraph, as illustrated in FIG. 7B. In this case, the summarized content 710, 720 may be displayed differently from currently displayed content 700. For example, the summarized content 710, 720 may be displayed to be brighter than the currently displayed content 700.

The processor 130 may generate the summarized content including different objects according to the type of the content. For example, when the type of content is news content or blog content, the processor 130 may generate summarized content including text. When the type of the content is shopping content, the processor 130 may generate summarized content including at least one of text and an image.

When content summarization is being performed, the processor 130 may control the display 110 to display the summarized content in an area corresponding to a location at which the user touch was input, from the display screen where the content is displayed. For example, when user input of touching the lower part of the display 110 is received while a part of the content 700 is displayed, the processor 130 may control the display 110 to display the summarized content 710, 720 in the lower part of the display 110 as illustrated in FIG. 7A or FIG. 7B.

Figure 8A:
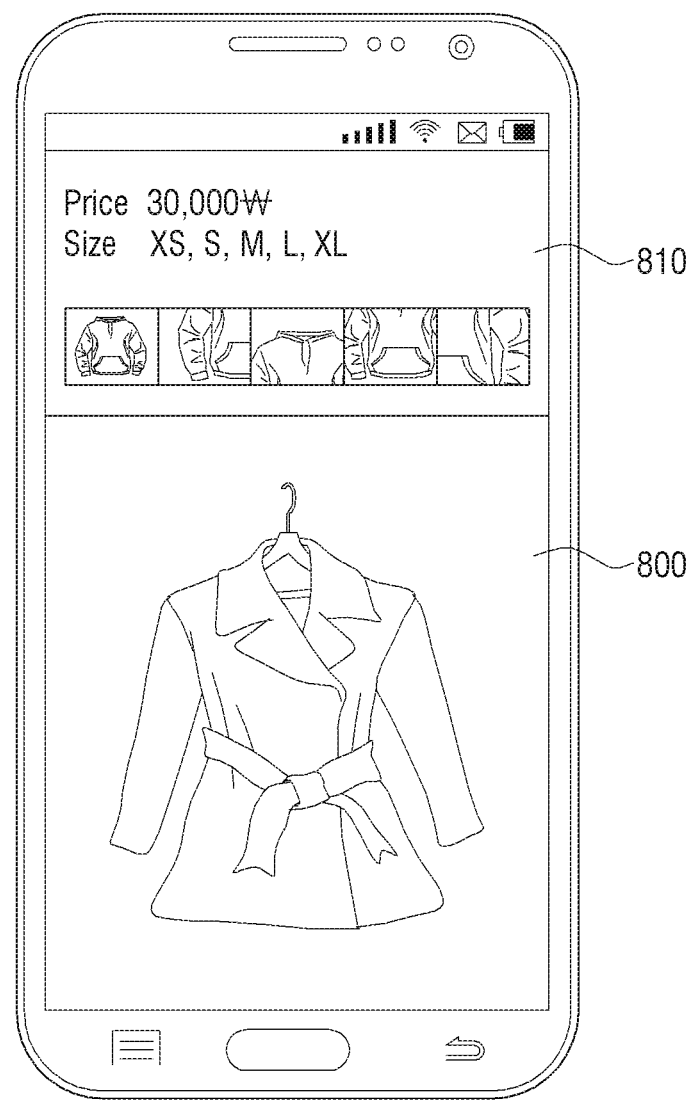
Figure 8B:
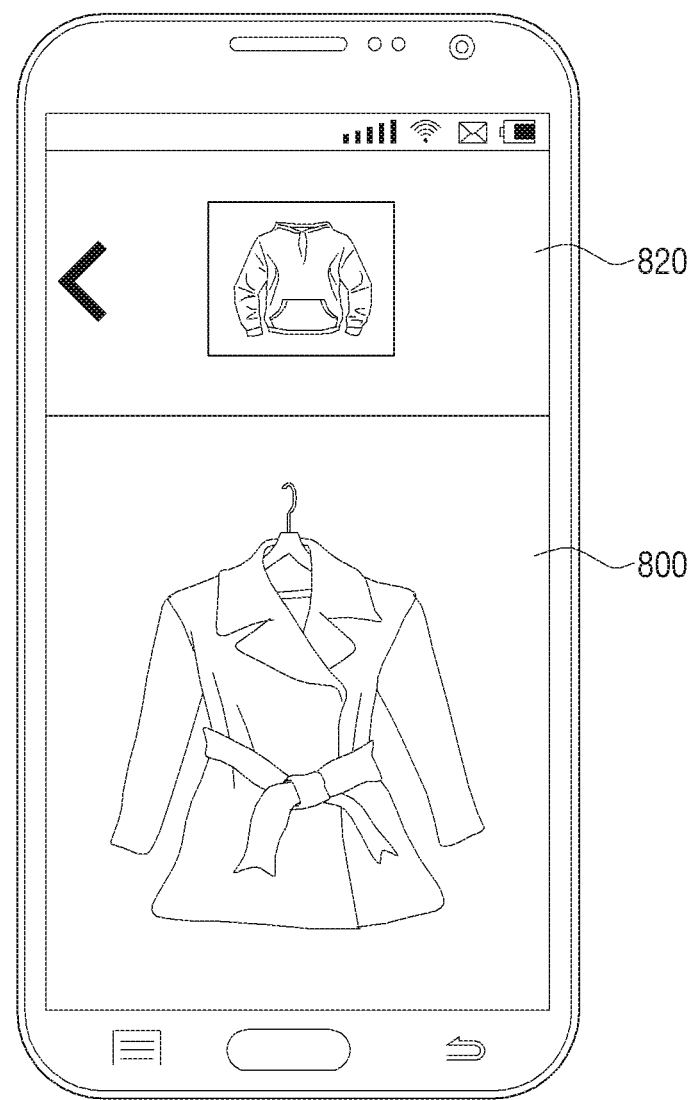

The processor 130 may provide detailed information through the summarized content. To be specific, when user input of touching the upper part is received while a part of shopping content 800 is displayed, the processor 130 may summarize the information in an upper part from among the areas which are not displayed in the display and control the display 110 to display summarized content 810 along with a part of the content 800 as illustrated in FIG. 8A. In this case, the summarized content 810 may include images of a product and text providing information about the product (e.g., price information, detailed information, or store information). Further, as illustrated in FIG. 8A, when a user input of touching some image of the summarized content 810 is received while a part of the shopping content 800 and the summarized content 810 in the upper part are displayed, the processor 130 may control the display 110 to display an enlarged image 820 in an area where the summarized content 810 is displayed.

Figure 9A:
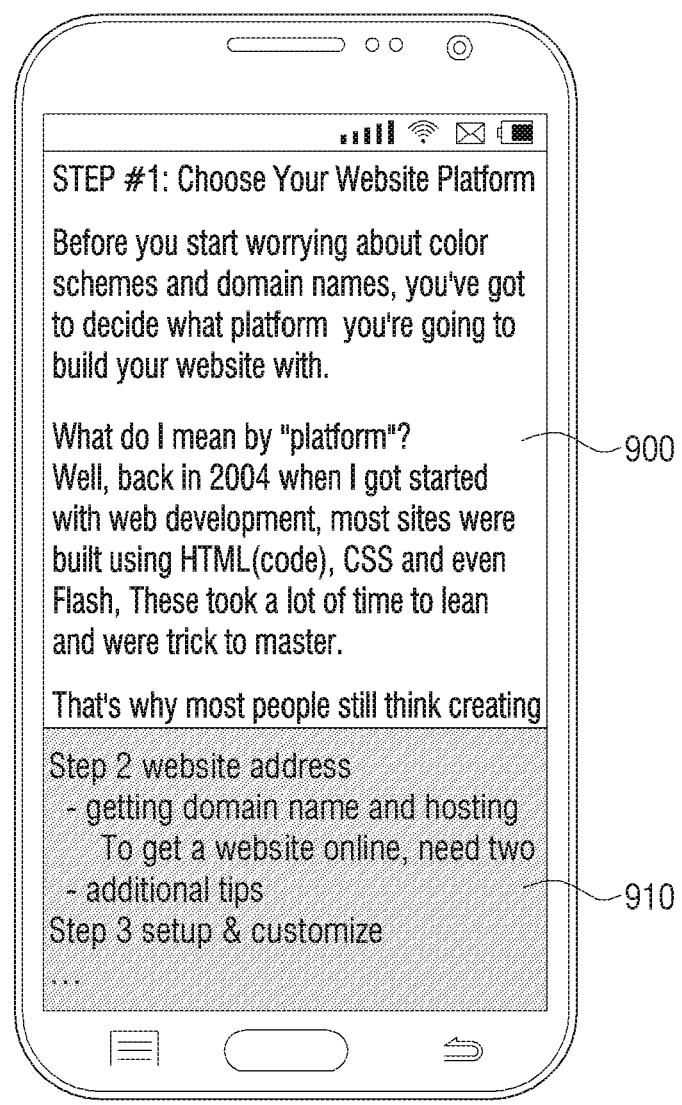
Figure 9B:
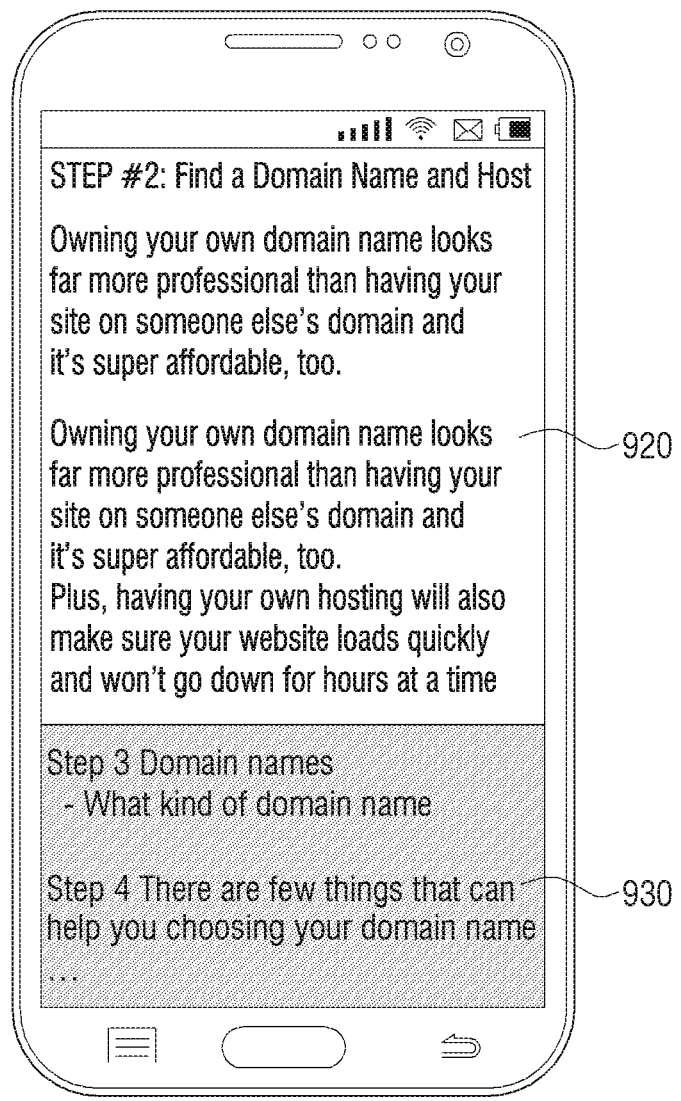

When user input is received on the summarized content, the processor 130 may control the display 110 to display the area corresponding to a part at which the user input was received of the summarized content. To be specific, as illustrated in FIG. 9A, when user input of touching a part of summarized content 900 (for example, step 2 website address) is received while a part of the content 900 and summarized content 910 are displayed, the processor 130 may control the display 110 to display an area 920 where a part of the currently displayed content corresponds to the location at which the user input was received as illustrated in FIG. 9B. In this case, the processor 130 may generate new summarized content 930 by changing the content summarization range of the summarized content and controlling the display 110 to display the new summarized content 930.

When user input for scrolling a screen is received while the summarized content is displayed, the processor 130 may control the display 110 to display summarized content having a content summarization range changed while a screen of the content is scrolled. To be specific, as illustrated in FIG. 9A, when a user input for scrolling a page is received while a part of the content 900 and the summarized content 910 are displayed, the processor 130 may control the display 110 to scroll and display a part of the currently displayed content as illustrated in FIG. 9B. In this case, the processor 130 may generate new summarized content 930 by changing the content summarization range according to the user input for scrolling the page and control the display 110 to display the new summarized content 930.

Figure 10A:
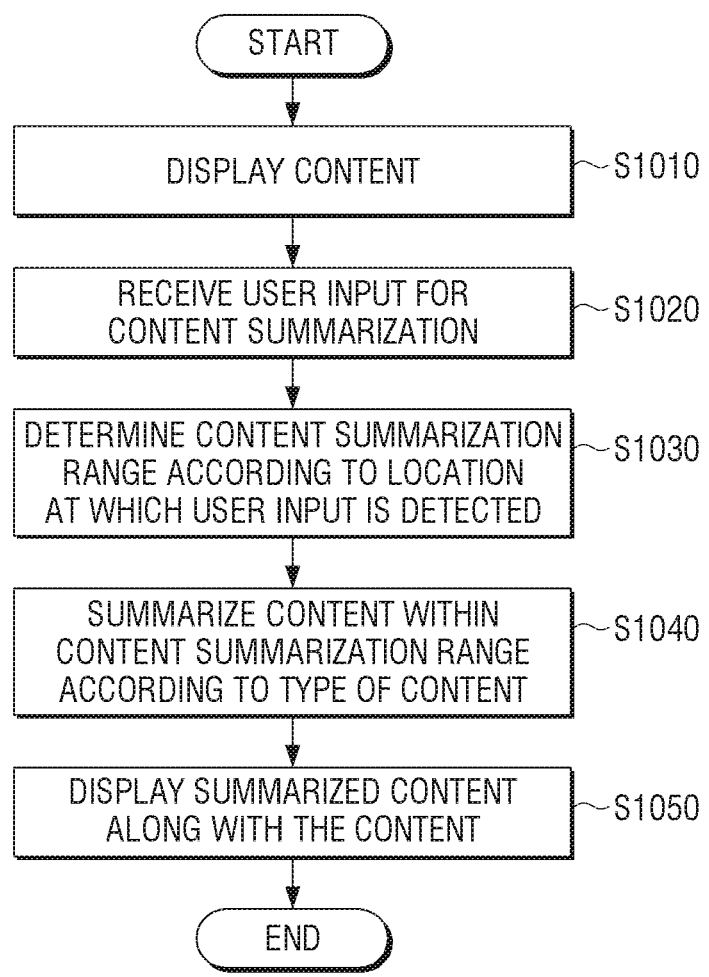
FIG. 10A is a flowchart provided to describe a method for controlling an electronic apparatus for content summarization according to an example embodiment disclosed herein.

FIG. 10A is a flowchart provided to describe a method for summarizing content of an electronic apparatus according to an example embodiment disclosed herein.

An electronic apparatus 100 displays content (S1010). In this case, the electronic apparatus 100 may display only a part of the areas of the content.

Subsequently, the electronic apparatus 100 determines whether a user input for content summarization is received (S1020). In this case, the user input for content summarization may be a user touch of touching a certain area of a display.

The electronic apparatus 100 determines a content summarization range according to a location at which the user input was detected (S1030). In this case, the electronic apparatus 100 may determine as the content summarization range an area, corresponding to the user input, from among the content areas which are not displayed in the display.

The electronic apparatus 100 summarizes the content within the content summarization range according to the type of content (S1040). The electronic apparatus 100 may perform content summarization so the content is summarized by different content summarization units according to the type of the content.

The electronic apparatus 100 displays the summarized content along with the content (S1050).

Figure 10C:
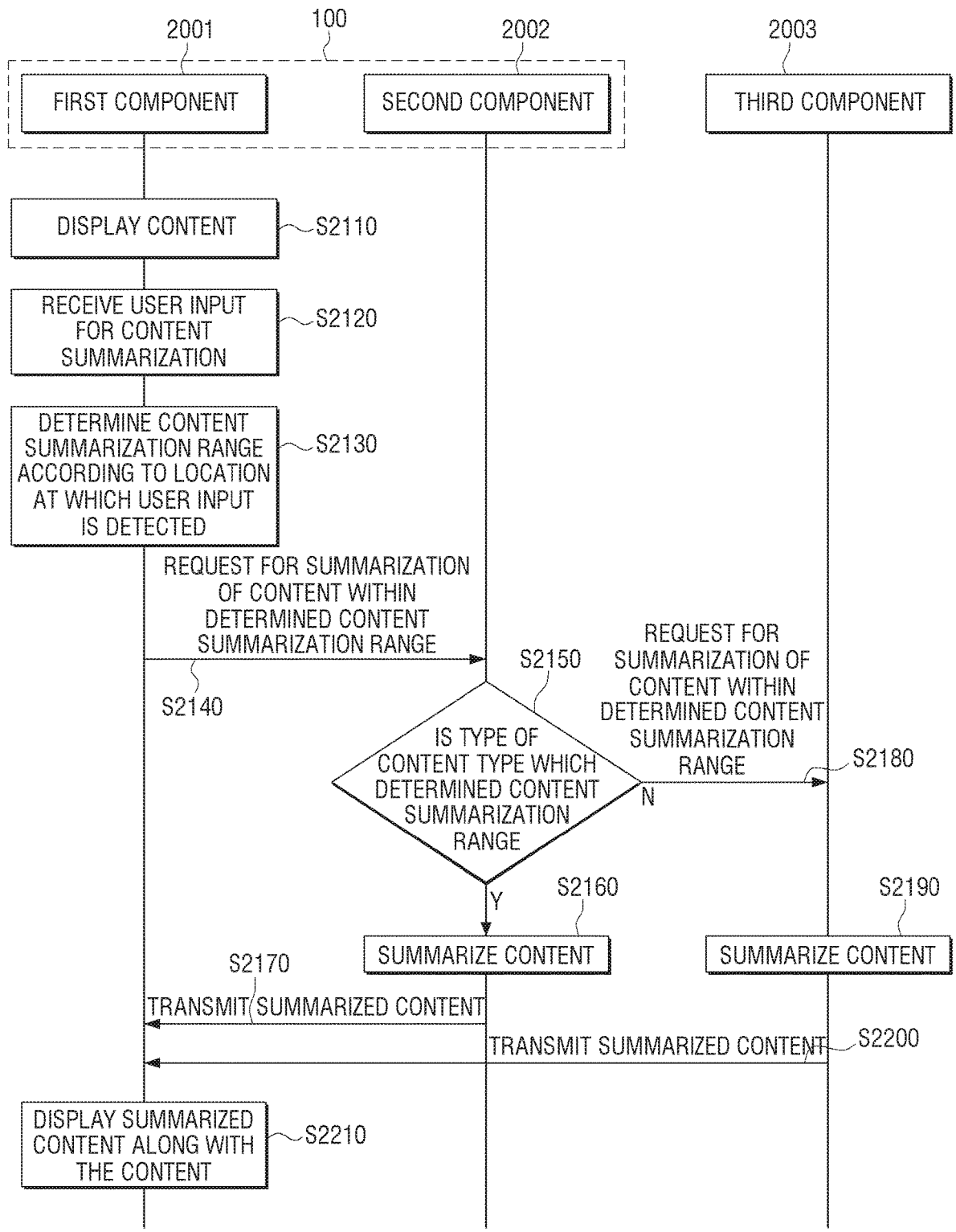
FIG. 10C is a flowchart provided to describe an example in which a second component and a third component summarize content respectively by using a data summarization model according to a type of the content.

FIGS. 10B and 10C are diagrams provided to describe an example of using a data summarization model according to an example embodiment disclosed herein.

In FIGS. 10B and 10C, a first component 2001 may be the electronic apparatus 100, and a second component 2002 may be a server 1100 (see FIG. 11) where a data summarization model is stored. Further, the first component 2001 may include a universal general-purpose processor, and the second component 2002 may include a dedicated processor for AI. Further, the first component 2001 may include at least one application, and the second component 2002 may include an Operating System (OS).

That is, the second component 2002 may be more integrated, more dedicated (specialized), provide less delays, provide higher performance, and/or provide a large amount of resources as compared with the component 2001. Accordingly, the second component 2002 may be capable of processing a large number of calculations required to generate, update, or apply the data summarization model more quickly and effectively.

According to various example embodiments, a third component 2003 which performs similar functions as the second component 2002 may be added (see FIG. 10C).

In this case, an interface for transmitting/receiving data between the first component 2001 and the second component 2002 may be defined.

By way of example, an Application Program Interface (API) having summarized data for learning to be applied to the data summarization model as a factor value may be defined. The API may be defined as a set of subroutines or functions called from any one protocol (for example, a protocol defined in electronic apparatus 100) for any processing operation of another protocol (for example, a protocol defined in the server 1100). That is, an environment where any one protocol performs an operation of another protocol may be provided through the API.

FIG. 10B is a flowchart provided to describe an example in which the first component summarizes content by using the data summarization model.

The first component 2001 displays content (S2010). In this case, the first component 2001 may display only a part of the areas of the content.

The first component 2001 may determine whether a user input for content summarization is received (S2020). In this case, the user input for content summarization may be, without limitation, a user touch of touching a certain area from the display.

The first component 2001 may determine the content summarization range according to the location at which the user input is detected (S2030). In this case, the first component 2001 may determine, as the content summarization range, an area corresponding to the user input from among the content areas which are not displayed on the display.

The first component 2001 may request summarization of the content within the determined content summarization range by the second component 2002 (S2040).

The second component 2002 summarizes the content within the content summarization range according to the type of content (S2050). In this case, the second component 2002 may summarize the content so as to have different content summarization units according to the type of content.

The second component 2002 may transmit the summarized content to the first component 2001 (S2060).

The first component 2001 may display the received summarized content along with the content (S2070).

FIG. 10C is a flowchart provided to describe an example in which the second component and the third component summarize the content by using the data summarization model according to a type of content, respectively.

According to an example embodiment, the first component 2001 and the second component 2002 may be components included in the electronic apparatus 100, and the third component 2003 may be a component located outside the electronic apparatus 100, but the present disclosure is not limited in this respect.

The first component 2001 displays content (S2110). In this case, the first component 2001 may display only a part of the areas of the content.

Subsequently, the first component 2001 determines whether a user input for content summarization is received (S2120). In this case, the user input for content summarization may, for example, be a user touch of touching a certain area of the display, but the present disclosure is not limited in this respect.

The first component 2001 determines the content summarization range according to the location at which the user input is detected (S2130). In this case, the first component 2001 may determine, as the content summarization range, an area corresponding to the user input from among the content areas which are not displayed on the display.

The first component 2001 may request summarization of the content within the determined content summarization range by the second component 2002 (S2140).

The second component 2002 may determine whether the type of content is a type which may be summarized in the electronic apparatus 100 (S2150).

As an example, when the content is text, the second component 2002 may summarize the text by using a data summarization model configured to summarize text included in the electronic apparatus 100 (S2160). Subsequently, the second component 2002 may transmit the summarized content to the first component 2001 (S2170).

As another example, when the content is video, the second component 2002 may request summarization of the content within the determined content summarization range by the third component 2003 (S2180). The third component 2003 may summarize the video by using a data summarization model configured to summarize video (S2190). In this case, the summarized content may be a summarized video or a plurality of images generated by extracting a part(s) of frames of the video, for example.

The third component 2003 may transmit the summarized content to the first component 2001 (S2200).

The first component 2001 may display the received summarized content along with the content (S2210).

According to the above-described various example embodiments, the user can be provided with summarized content for an area which is not currently displayed more intuitively and conveniently.

Meanwhile, in the above example embodiments, the electronic apparatus 100 learns and summarizes data, but this is only an example, and the electronic apparatus 100 may learn and summarize the data in conjunction with an external server.

Figure 11:
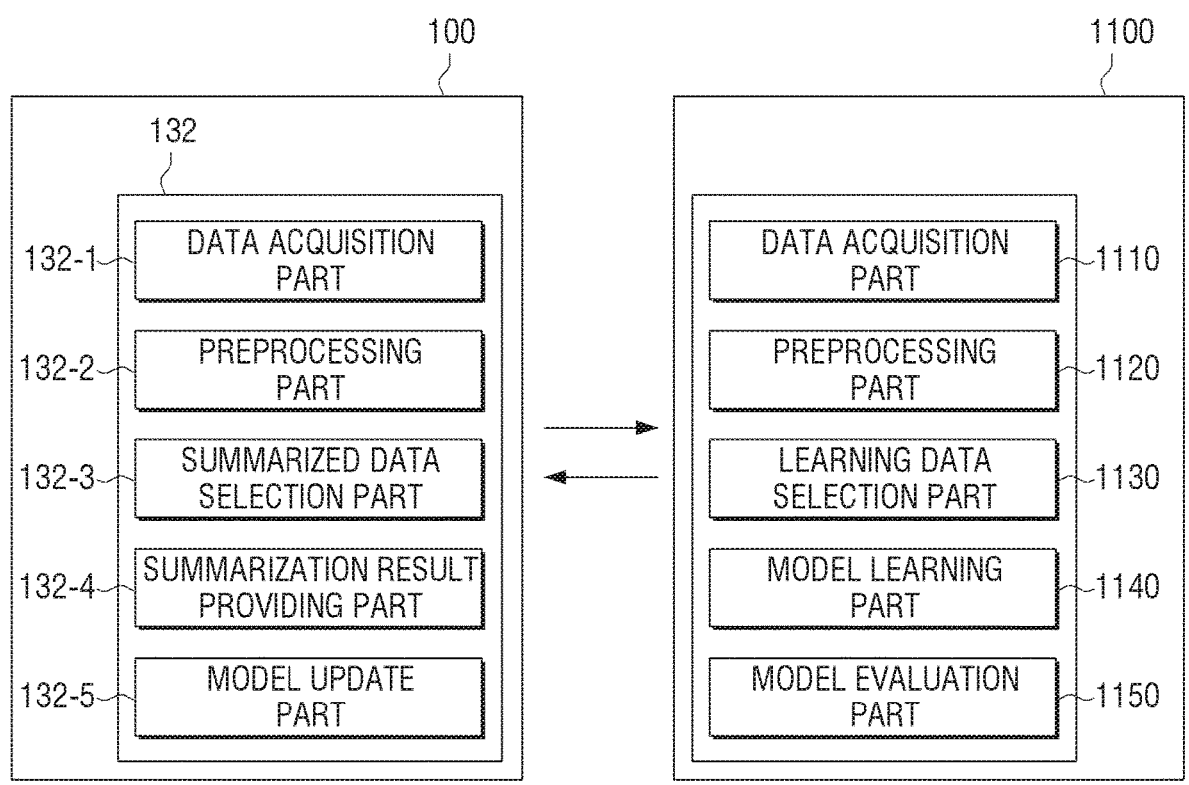
FIG. 11 is a diagram provided to describe an example in which an electronic apparatus summarizes data by using a data summarization model in conjunction with a server according to another example embodiment disclosed herein.

FIG. 11 is a diagram provided to describe an example in which the electronic apparatus 100 and the server 1100 learn and recognize data through interworking according to some example embodiments.

According to an example embodiment, the electronic apparatus 100 may interwork with the server 1100 over a local area network or by long distance communication. The interworking of the electronic apparatus 100 and the server 1100 may include an operation in which the electronic apparatus 100 and the server 1100 are connected directly or an operation in which the electronic apparatus 100 and the server 1100 are connected through another component (for example, at least one of an Access Point (AP), a hub, a relay device, a base station, a router, and a gateway).

Referring to FIG. 3, the server 1100 may learn the criteria for content summarization, and the electronic apparatus 100 may perform content summarization by using a data summarization model generated based on a learning result of the server 1100.

In this case, the server 1100 may perform the functions of the data learning unit 131 of FIG. 3. A model learning part 1140 of the server 1100 may learn the criteria as to which data to use in order to summarize the content and as to how to summarize the content by using the data. The model learning unit 1140 may learn the criteria for content summarization by acquiring summarized data to be used in the learning operation and applying the acquired summarized data to the data summarization model. A detailed description on the data summarization model will be provided below.

By way of example, the model learning unit 1140 may allow the data summarization mode to learn by using the content (for example, text, an image, and a video) and generate the data summarization model configured to generate summarized information of the content. The generated data summarization model may be a data summarization model configured to summarize text, for example.

The summarization result providing part 132-4 of the electronic apparatus 100 may summarize the content by applying the summarized data selected by the summarized data selection part 132-3 to the data summarization model generated by the server 1100. By way of example, the summarization result providing part 132-4 may transmit the summarized data selected by the summarized data selection part 132-3 to the server 1100, and the server 110 may apply the data selected by the summarized data selection part 132-3 to the data summarization model. Accordingly, the summarization result providing part 132-4 may summarize the content. Further, the summarization result providing part 132-4 may receive information on the summarized content generated by the server 1100 from the server 1100.

For example, when the content includes text, the server 1100 may summarize the text by applying the text to the data summarization model configured to summarize text and provide the summarized text to the summarization result providing part 132-4 of the electronic apparatus 100.

According to an example embodiment, the summarization result providing part 132-4 of the electronic apparatus 100 may receive the data summarization model generated by the server 1100 from the server 1100 and summarize the content by using the received data summarization model. In this case, the summarization result providing part 132-4 of the electronic apparatus 100 may summarize the content by applying the summarized data selected by the summarized data selection part 132-3 to the data summarization model received from the server 1100.

For example, when the content includes text, the server 1100 may summarize the text by applying the text to a data summarization model configured to summarize text received from the server 1100 and provide the summarized text to the processor of the electronic apparatus 100 (for example, the processor 130 of FIG. 1). In this case, the processor 130 may control the display (for example, the display 110 of FIG. 1) to display the summarized text.

The above-described methods may be realized as program instructions which are executable by diverse computer systems and recorded in a non-transitory computer readable medium. The non-transitory computer readable medium may include program instructions, data files, and data structures or combinations thereof. The program instructions recorded in the medium may be specially designed and configured for the present disclosure or may have been publicly known and available to a person having ordinary skill in the computer software field. The non-transitory computer readable medium may include a hardware device which is specially configured to store and execute program instructions, such as, magnetic mediums including a hard disk, a floppy disk, or a magnetic tape, optical mediums including a Compact Disc Read-Only Memory (CD-ROM) or a Digital Versatile Disk (DVD), magneto-optical mediums including a floptical disk, a Read-Only Memory (ROM), a Random Access Memory (RAM), and a flash memory. The program instructions may include a high-level language code which is executable by a computer by using an interpreter as well as a machine language code generated by a compiler, for example. The hardware device may be configured to operate as one or more software modules in order to perform the operations of the present disclosure, and vice versa.

Further, the above-described methods according to the example embodiments disclosed herein may be provided as computer program products.

The computer program products may include a software program, a recording medium which is readable by a computer with a software program, or a product transacted between a seller and a buyer.

By way of example, the computer program products may include a product in a form of a software program (for example, a downloadable application) which is electrically distributed through the electronic apparatus 100, a manufacturer of the electronic apparatus 100, or an e-market (for example, Google Play Store or App Store). For the electrical distribution, at least some of the software program may be stored in a recording medium or may be temporarily generated. In this case, the recording medium may be a recording medium of a server of the manufacturer or the e-market or a recording medium or a relay server.

As noted above, the present disclosure is described by certain example embodiments and drawings, but the disclosure is not limited to these examples. The present disclosure may be modified and changed by a person having ordinary skill in the art. The scope of the present disclosure should not be limited by the example embodiments disclosed herein and should defined by the claims provided below and the equivalents thereof.

What is claimed is:

1. A method for summarizing content of an electronic device, the method comprising:
   displaying a first portion of the content on a display;
   receiving a first touch input, while the first portion of the content is being displayed;
   determining a position where the first touch input is received on the display;
   identifying a second portion of the content different from the first portion of the content, based on the determined position on the display, wherein the second portion of the content is identified from among a plurality of different non-displayed portions of the content;
   obtaining summarization information related to the second portion of the content, by an AI (Artificial Intelligence) model;
   displaying, on an area corresponding to the determined position on the display, the summarization information along with the first portion of the content on the display;
   receiving a second touch input on a portion of the summarization information while the summarization information is displayed on the display along with the first portion of the content; and
   in response to the second touch input, displaying at least a part of the second portion of the content on the display,
   wherein an amount of the at least a part of the second portion of the content is greater than an amount of the summarization information.

2. The method as claimed in claim 1, further comprising:
   determining a type of the content by analyzing the content; and
   obtaining the summarization information related to the second portion of the content based on the determined type of the content.

3. The method as claimed in claim 1, further comprising:
   identifying, from among a plurality of different content summarization units, a content summarization unit based on a type of the first touch input, wherein the summarization information is obtained based on the identified content summarization unit.

4. The method as claimed in claim 1, further comprising: scrolling the displayed content, based on receiving input for scrolling while the summarization information is displayed, the summarization information having a content summarization range changed according to the screen scrolling.

5. The method as claimed in claim 1, wherein the summarization information is obtained based on a data summarization model generated using a learning algorithm.

6. The method as claimed in claim 1, wherein the obtaining of the summarization information comprises:
analyzing information of the second portion of the content;
extracting main text for a summary sentence based on the analyzed information; and
obtaining the summarization information by editing and arranging the extracted text.

7. The method as claimed in claim 1, wherein, based on the second portion of the content comprising shopping content for a plurality of products, the summarization information comprises images of the products and text about the products.

8. The method as claimed in claim 1, wherein the first touch input comprises a touch input to any of upper, lower, right, and left areas of the display.

9. An electronic device comprising:
a display; and
a processor configured to:
  display a first portion of the content on a display;
  receive a first touch input, while the first portion of the content is being displayed;
  determine a position where the first touch input is received on the display;
  identify a second portion of the content different from the first portion of the content, based on the determined position on the display, wherein the second portion of the content is identified from among a plurality of different non-displayed portions of the content;
  obtain summarization information related to the second portion of the content, by an AI (Artificial Intelligence) model;
  display, on an area corresponding to the determined position on the display, the summarization information along with the first portion of the content on the display;
  receive a second touch input on a portion of the summarization information while the summarization information is displayed on the display along with the first portion of the content; and
  in response to the second touch input, display at least a part of the second portion of the content on the display,
  wherein an amount of the at least a part of the second portion of the content is greater than an amount of the summarization information.

10. The device as claimed in claim 9,
wherein the processor is further configured to:
  determine a type of the content by analyzing the content; and
  obtaining the summarization information based on the determined type of the content.

11. The device as claimed in claim 9,
wherein the processor is further configured to, identify, from among a plurality of different content summarization units, a content summarization unit based on a type of the first touch input,
wherein the summarization information is obtained based on the identified content summarization unit.

12. The device as claimed in claim 9, wherein the processor is further configured to, scroll the displayed content, based on receiving input for scrolling while the summarization information is displayed, the summarization information having a content summarization range changed according to the screen scrolling.

13. The device as claimed in claim 9, wherein the summarization information is obtained based on a data summarization model generated using a learning algorithm.

14. The device as claimed in claim 9, wherein the processor is further configured to:
analyze information of the second portion of the content;
extract main text for a summary sentence based on the analyzed information; and
obtain the summarization information by editing and arranging the extracted text.

15. The device as claimed in claim 9, wherein, based on the second portion of the content comprising shopping content for a plurality of products, the summarization information comprises images of the products and text about the products.

16. The device as claimed in claim 9, wherein the first touch input comprises a touch input to any of upper, lower, right, and left areas of the display.

17. A non-transitory computer readable recording medium including a program for executing a controlling method of an electronic device comprising:
displaying a first portion of the content on a display;
receiving a first touch input, while the first portion of the content is being displayed;
determining a position where the first touch input is received on the display;
identifying a second portion of the content different from the first portion of the content, based on the determined position on the display, wherein the second portion of the content is identified from among a plurality of different non-displayed portions of the content;
obtaining summarization information related to the second portion of the content, by an AI (Artificial Intelligence) model;
displaying, on an area corresponding to the determined position on the display, the summarization information along with the first portion of the content on the display;
receiving a second touch input on a portion of the summarization information while the summarization information is displayed on the display along with the first portion of the content; and
in response to the second touch input, displaying at least a part of the second portion of the content on the display,
wherein an amount of the at least a part of the second portion of the content is greater than an amount of the summarization information.

* * * * *